United States Patent [19]

Volk

[11] 4,350,066
[45] Sep. 21, 1982

[54] COVE MOLDING CUTTING APPARATUS AND ATTACHMENT

[76] Inventor: Michael J. Volk, 216 McKeon Rd., Severna Park, Md. 21146

[21] Appl. No.: 212,888

[22] Filed: Dec. 4, 1980

Related U.S. Application Data

[63] Continuation-in-part of Ser. No. 128,554, Mar. 10, 1980, Pat. No. 4,320,678.

[51] Int. Cl.³ .................. B27B 27/06; B27B 11/04
[52] U.S. Cl. .................................. 83/763; 83/574; 83/581; 83/522; 269/295
[58] Field of Search ............... 83/574, 761, 762, 763, 83/764, 765, 766, 767, 581, 471.3, 486.1, 488, 522, 432, 465, 455; 269/293, 295

[56] References Cited

U.S. PATENT DOCUMENTS

| | | | |
|---|---|---|---|
| 952,270 | 3/1910 | Milks | 83/761 |
| 2,799,077 | 7/1957 | Mitchell | 269/293 |
| 3,397,722 | 8/1968 | Long | 83/762 |
| 3,782,235 | 1/1974 | Curcio | 83/762 |
| 4,096,777 | 6/1978 | Adams | 83/762 |
| 4,250,624 | 2/1981 | Partington | 83/455 |
| 4,281,827 | 8/1981 | Horwath | 83/766 |
| 4,320,678 | 3/1982 | Volk | 83/574 |

*Primary Examiner*—Donald R. Schran
*Attorney, Agent, or Firm*—Brady, O'Boyle & Gates

[57] ABSTRACT

Precision cutting of cove molding in all commercial sizes and designs is obtained by an apparatus which includes a flat bed plate having a straight saw blade slot formed therethrough and a power saw guideway along the slot. A rest for cove molding extending away from one side of the saw blade slot at an angle of 45 degrees thereto includes opposite side flat surfaces which rise from the top of the bed plate at angles of 45 degrees to the bed plate, the rest having a flat bottom surface to engage the bed plate. As an attachment to existing saw table equipment, the cove molding rest may have a bottom recess including an end stop surface to fit over a protractor guide of the existing equipment. All customary angle cuts of the cove molding are greatly facilitated.

10 Claims, 21 Drawing Figures

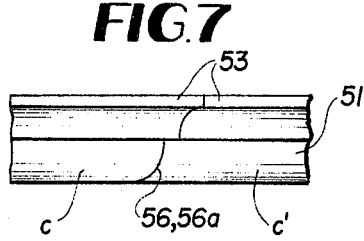
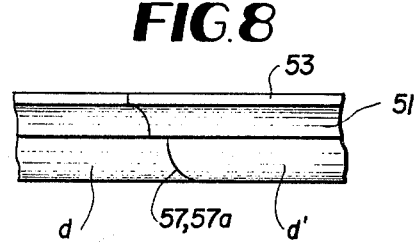
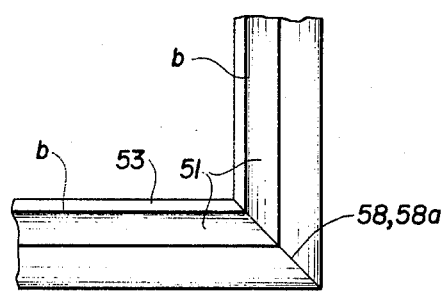
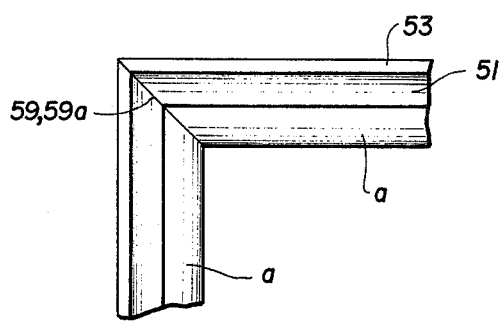
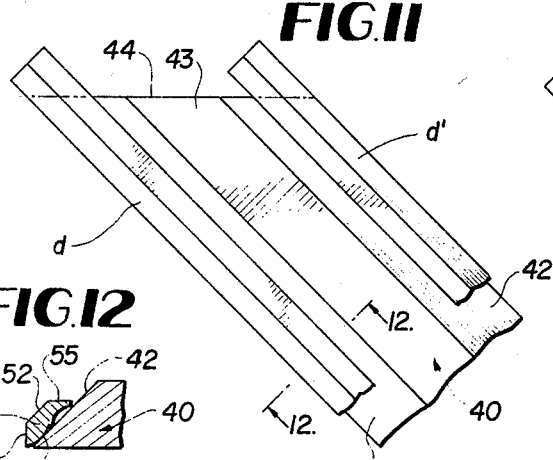
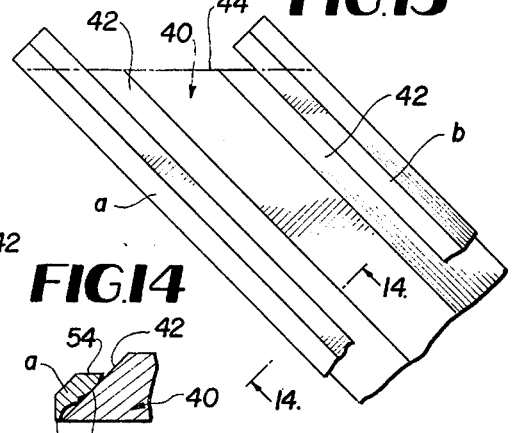
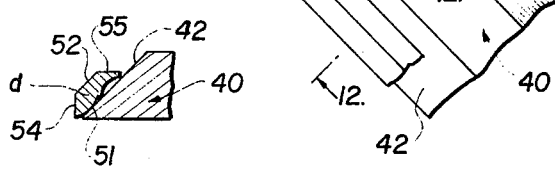
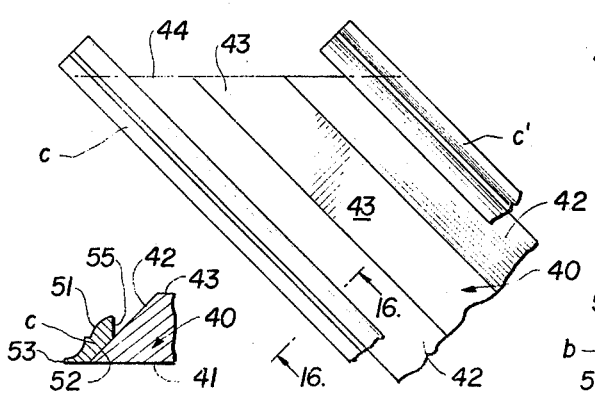
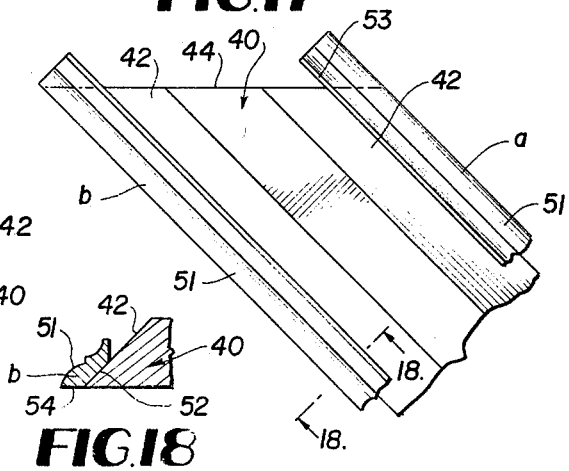

COVE MOLDING CUTTING APPARATUS AND ATTACHMENT

CROSS-REFERENCE TO RELATED APPLICATION

This application is a continuation-in-part of prior copending application Ser. No. 06/128,554, filed Mar. 10, 1980, for PORTABLE POWER TOOL ACCESSORY TABLE, now U.S. Pat. No. 4,320,678.

BACKGROUND OF THE INVENTION

The cutting of cove molding with precision to form inside or outside molding corners or simple splices between molding sections presents an awkward problem which has not heretofore been satisfactorily solved. Customarily, the carpenter or home owner faced with the problem will seek to employ a conventional mitre box to make the necessary 45 degree cuts across the molding but the mitre box is not suited to this operation because it cannot position the cove molding properly to produce the cut in the correct plane, which is a compound plane whereas the mitre box can only facilitate the formation of a mitre cut in a simple plane. Usually, the workman attempts to hold the cove molding in a correct position for cutting against a wall of the mitre box but this is very difficult to do by hand and there is no ready means for clamping the cove molding in the necessary position for precision cutting. Various other haphazard cutting methods are frequently attempted involving much guesswork and in many cases inaccurate and unsightly cutting results spoiling the splice or corner joint.

The present invention offers a complete solution to the problem of cutting all types of cove molding in all commercial sizes with precision and uniformity. The invention accomplishes this objective through the use of a simplified apparatus which may efficiently employ a sabre saw as the cutting instrumentality. The essence of the invention resides in a rest of the cove molding which includes opposite side upwardly converging flat inclined surfaces rising from a flat bed plate at precision angles to the bed plate of 45 degrees. By placing the cove molding against the proper one of the inclined surfaces on the rest with either the sculptured front face or the back of the molding against the rest and either the top or bottom of the molding against the bed plate, all customary cove molding cuts can be made rapidly and with precision and uniformity even by an unskilled worker holding the molding thereagainst with one hand and manipulating the saw to make the cuts with the other hand.

The cove molding rest can be included in a newly manufactured apparatus or can be installed as an attachment on existing saw table devices, such as the accessory table in the above-referenced patent application.

Other objects and advantages of the invention will become apparent during the course of the following detailed description.

BRIEF DESCRIPTION OF THE DRAWINGS

FIGS. 7 and 8 are elevational views showing left and right hand splices.

FIGS. 9 and 10 are similar views showing outside and inside corners, respectively.

FIG. 11 is a fragmentary plan view of a cove molding rest with two molding sections engaging the rest for proper cutting to form a right hand splice.

FIG. 12 is a fragmentary transverse vertical section taken on line 12—12 of FIG. 11.

FIG. 13 is a view similar to FIG. 11 with molding sections positioned for cutting to produce components for outside and inside corner joints.

FIG. 14 is a fragmentary transverse vertical section taken on line 14—14 of FIG. 13.

FIG. 15 is a view similar to FIG. 11 with cove molding sections positioned for cutting to produce a left hand splice.

FIG. 16 is a view similar to FIG. 12 taken on line 16—16 of FIG. 15.

FIG. 17 is a view similar to FIG. 13 with the molding sections arranged in relation to the rest to form outside and inside corner components after cutting.

FIG. 18 is a view similar to FIG. 14 taken on line 18—18 of FIG. 17.

DETAILED DESCRIPTION

Figure 1:
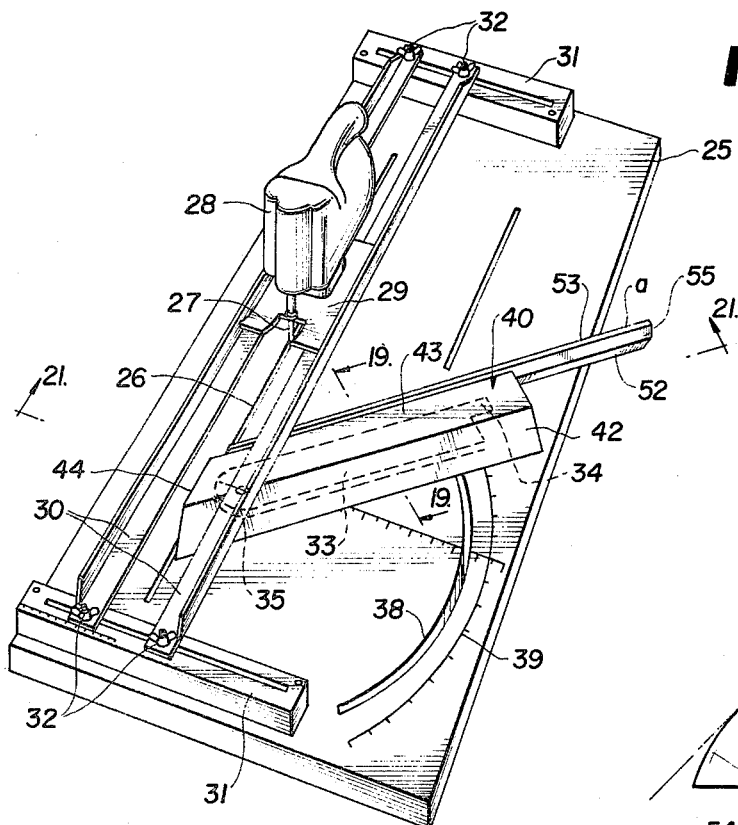
FIG. 1 is a perspective view of an apparatus for cutting cove molding in accordance with the invention.

Referring to the drawings in detail and referring initially to FIGS. 1 and 19 through 21, a flat bed plate 25 or table has an elongated straight saw blade slot 26 formed therethrough to receive the blade 27 of a sabre saw 28 having a sole plate 29 which is guidingly engaged with spaced parallel guide rails 30 formed as angle bars in accordance with the above-referenced application. The opposite ends of the rails are supported on spacer bars 31 at a suitable elevation above and parallel to the top surface of the bed plate 25. As described in said application, the rails 30 are arranged for lateral adjustment on the bars 31 relative to each other and relative to the slot 26 through adjustable fastener means 32.

Still in accordance with the referenced application, a protractor arm 33 including an extensible and retractable workpiece guide 34 is pivotally attached as at 35 to the bed plate 25 and locked in a 45 degree angled position relative to the slot 26 and guide rails 30 by a locking fastener 36. Workpiece guide 34 is locked in the fully retracted position on the protractor arm 33 by a locking fastener 37, FIG. 19. The locking fastener 36 for protractor arm 33 engages through arcuate slot 38 in the bed plate 25 centered on the pivot axis 35 and positioned near a protractor graduated scale 39. All of this construction is fully described in the aforementioned patent application.

The key element of the invention resides in a cove molding rest 40 which is a unitary bar-like member of elongated form. The rest has a broad flat bottom face 41 which abuts the flat top face of bed plate 25 in use. It further comprises opposite side longitudinal flat upwardly converging inclined faces 42 which rise from the bed plate 25 at precise angles of 45 degrees thereto. The tops of the inclined faces 42 are preferably separated by a flat top surface 43 whose width may vary. One end face 44 of the rest 40 is formed precisely at an angle of 45 degrees to one longitudinal edge of the rest, FIG. 20, and to the opposite end face 45 which is preferably square.

To enable the rest 40 to be installed as an attachment over the protractor arm 33 and guide 34, it is provided at its bottom with a precision longitudinal rectangular cross section recess 46 located at the transverse center of the rest and opening through its angled end face 44 and extending for the major portion of the length of the rest but terminating therein somewhat short of the end face 45. The recess or cavity 46 is sufficiently deep to accommodate the tops of fasteners 36 and 37 without interference and the width of the recess 46 enables it to receive the arm 33 and retracted guide 34, FIG. 19, snugly with precision. The recess 46 includes a blind extension 47 at the rear end thereof to receive a short projecting end of the retracted workpiece guide 34. The end face of this guide 34, FIG. 21, forms a stop for the rest 40 which positions its 45 degree angled end face precisely in a vertical plane coinciding with one side of the saw blade 27.

Figure 21:
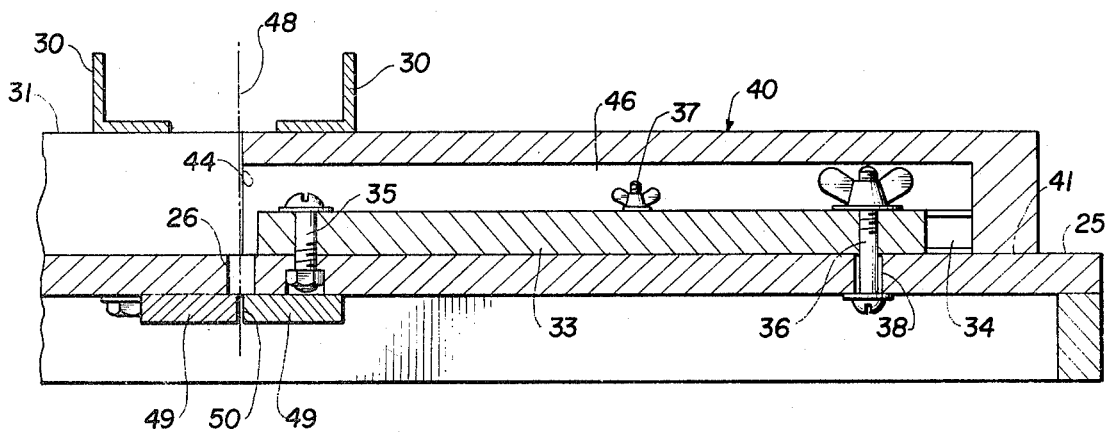
FIG. 21 is an enlarged fragmentary vertical section taken on line 21—21 of FIG. 1.

With reference to FIG. 21, the vertical center line of the saw blade is indicated at 48. As described in the referenced application, precision parallel guide plates 49 for the sabre saw blade are attached to the bottom of bed plate 25 in parallel relationship to form a guide slot 50 for the saw blade between them much narrower than the slot 26 and approximately equal to the thickness of the saw blade 27. Therefore, when the rest is placed over protractor arm in the described manner with the guide 34 serving as a stop, the angled end face 44 is precisely aligned with the near side of the slot 50, corresponding to one side face of the saw blade. This arrangement is important in assuring guidance and support of the cove molding engaged with the rest 40 up to the very point of cutting by the saw blade.

While the rest 40 has been shown and described as an attachment to fit over an existing protractor arm of an apparatus such as shown in the prior application, it should be understood that the rest can be made a part of a newly manufactured apparatus without dependency on any protractor arm and without the necessity for the recess 46. In such a case, the rest 40 can be a solid member fixedly mounted at 45 degrees to the saw blade slot of a suitable flat bed plate having guideway means for any suitable cutting saw.

Figure 2:
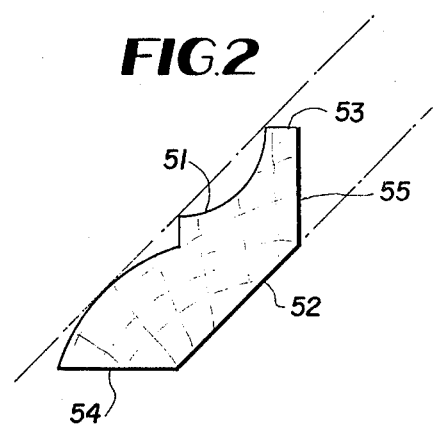
FIG. 2 is a transverse cross section through a section of cove molding.

FIG. 2 of the drawings shows a cross section of a typical commercial cove molding having a sculptured front face 51, a back face 52, a surface 53 which customarily forms the bottom of the molding, and a parallel surface 54 which customarily forms the top of the molding as where the molding abuts a ceiling. A vertical surface 55 on the typical cove molding would normally abut a wall. The use of the invention in FIGS. 11 through 18 will be described relative to a molding of the type shown in FIG. 2. It should be understood however that the cove molding can be designed differently from the one shown in FIG. 2 and in many instances is formed symmetrically top to bottom so that either horizontal surface can be installed upwardly or downwardly, making the cutting procedure even simpler as will be understood in the following description. The illustration in FIG. 2 with non-symmetrical top and bottom on the molding is chosen so that the most complex use of the invention can be understood.

Figure 3:
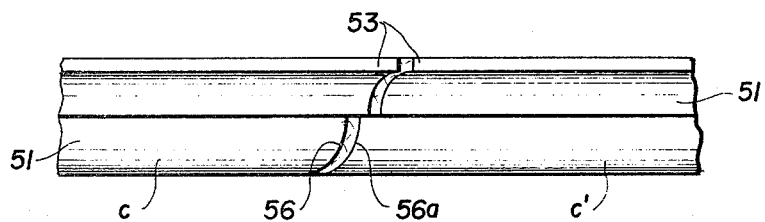
FIGS. 3 through 6 are elevational views of cove molding sections showing all of the customary cuts required for splicing the cove molding and making inside and outside corners.
Figure 4:
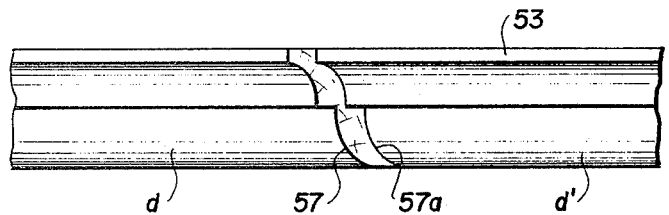

FIGS. 3 through 6 show the eight possible 45 degree angle cuts which are produced by the apparatus to make the left and right hand molding splices shown in FIGS. 7 and 8, respectively, to make the outside and inside molding corners shown in FIGS. 9 and 10, respectively. The left hand splice cuts 56 and 56a are shown in FIG. 3. The right hand splice cuts 57 and 57a are shown in FIG. 4. The assembled splices involving these cuts appear in FIGS. 7 and 8.

Figure 5:
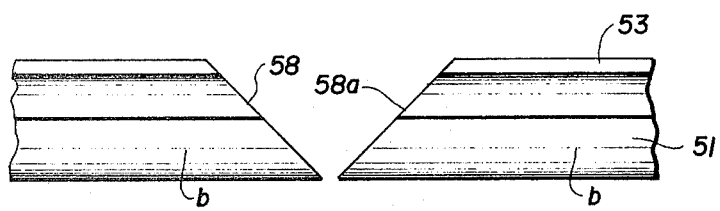
Figure 6:
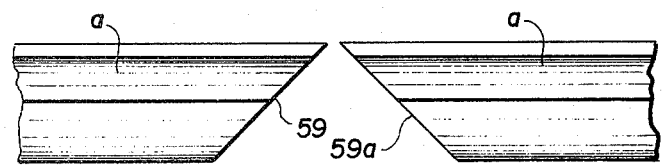

Similarly, the two mitre cuts 58 and 58a required to form the outside corner, FIG. 9, are shown in FIG. 5 and the two cuts 59 and 59a required to produce the inside corner structure of FIG. 10 are shown in FIG. 6. All of these various cuts are made with high precision merely by changing the engaging relationship of the molding sections with the inclined side surfaces of the rest 40 and the bed plate 25, as will now be summarized in connection with FIGS. 11 through 18.

Figure 19:
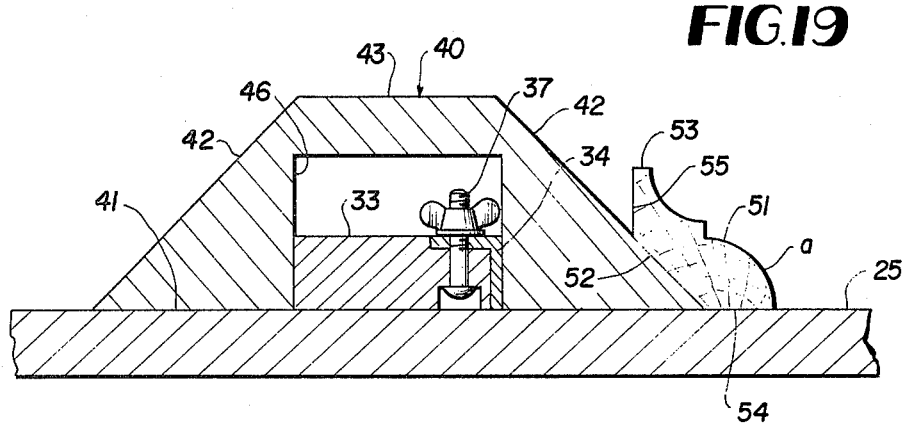
FIG. 19 is an enlarged fragmentary vertical section taken on line 19—19 of FIG. 1.
Figure 20:
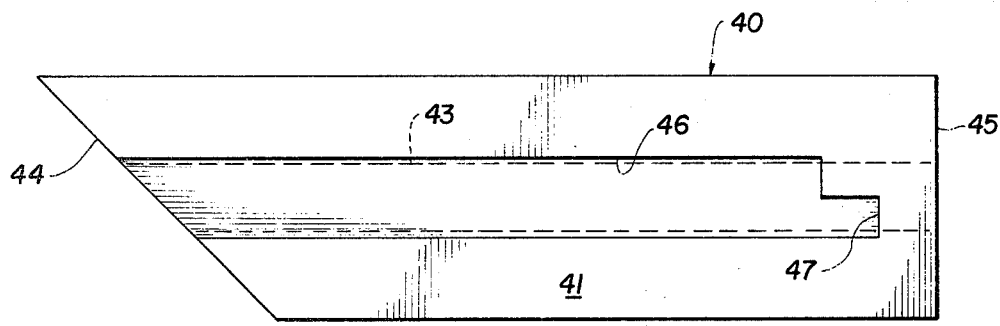
FIG. 20 is a bottom plan view of the rest.

In making the inside corner of FIG. 10, molding section a has one end cut by saw blade 27 with the molding section a engaged with the front inclined face of the rest 40, FIG. 17, while the back 52 of the molding is facing the rest and the top face 54 of the molding abutting the top face of bed plate 25. This relationship is shown in FIG. 19. In all cases including the one just described, the saw blade 27 will cut the molding precisely at 45 degrees to its longitudinal axis along the angled end face 44 of the rest 40.

The other end of molding piece a is cut by placing the cove molding at the back of the rest 40, FIG. 13, with its front face 51 against the inclined surface 42 and the bottom 53 of the molding against the bed plate 25. This relationship is shown in FIG. 14.

To produce the outside corner shown in FIG. 9, the cove molding b, FIG. 13, is placed in front of the rest 40 with its face 51 engaging the adjacent inclined surface 42 of the rest and the molding bottom 53 contacting bed plate 55. To cut the other end of molding section b, the same is positioned at the rear of rest 40 as in FIG. 17 with the back 52 of the molding contacting the adjacent surface 42 and its top 54 engaging the bed plate 25. This relationship is clearly shown in FIG. 18.

To make the left hand splice shown in FIG. 7, two molding sections c and c', FIG. 15, are placed respectively at the rear and front of rest 40 with the back 52 engaging the inclined surface 42 in both instances. For the molding section c, its bottom 53 is against the bed plate 25 and the same relationship prevails for the molding section c'. The two molding sections c and c' thus positioned relative to the rest 40 are cut off with one pass of the saw blade 27, FIG. 15, while they are both held in position by one hand.

Finally, for making the right hand splice shown in FIG. 8, molding sections d and d', FIG. 11, are placed respectively at the rear and front of the rest 40 with the front face 51 of the moldings against the surfaces 42 and the molding top 54 against the bed plate 25. Again, the two cuts 57 and 57a for the right hand splice are made simultaneously by the saw blade along the plane of the angled end face 44 of the rest. In the cases of the cuts necessary to produce the inside and outside corners, FIGS. 10 and 9, the two cuts are not made simultaneously, but are made one at a time, the drawing figures merely showing the two molding sections in place against the rest 40 for convenience of illustration, FIGS. 13 and 17.

In many cases, where the cove molding is symmetrical top to bottom, care need only be taken to place the particular molding section correctly at the front or back of the rest 40 with either the front face 51 or rear face 52 against the proper inclined surface 42 of the rest. This further simplifies the cutting procedure where moldings are identical at their tops and bottoms.

It has now been made clear to those skilled in the art that the use of the simple rest 40 for cove molding with its two 45 degree inclined side faces 42 acting in concert with the top surface of bed plate 25 makes possible the rapid and precise cutting of the cove molding in all ways necessary to produce right and left hand splices and inside and outside corner joints. The advantages of the invention over the known prior art should now be readily apparent.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. An apparatus for cutting cove molding comprising a flat bed plate having at least one straight edge for the guidance of a saw blade, a cove molding rest on the bed plate disposed at an angle of 45 degrees to said straight edge and extending away from said edge in one direction, and said rest having a pair of flat parallel inclined upwardly converging side surfaces rising at angles of 45 degrees to the top face of the bed plate and extending for the entire length of said rest.

2. An apparatus for cutting cove molding as defined in claim 1, and said straight edge being defined by a straight saw blade slot in said bed plate extending across the longitudinal axis of said rest, and said rest having an end face normal to the plane of the bed plate and parallel to the slot and coinciding with said straight edge.

3. An apparatus for cutting cove molding as defined in claim 2, and a pair of closely spaced parallel precision guides for a saw blade on the bed plate, one guide defining said straight edge.

4. An apparatus for cutting cove molding as defined in claim 3, and a saw guideway on the bed plate along and parallel to said straight edge.

5. An apparatus for cutting cove molding as defined in claim 1, and a linear guideway for a saw along and parallel to said straight edge.

6. An attachment for a sawing table apparatus having saw guideway means and a protractor arm adapted to be locked at a 45 degree angle to the guideway means, the apparatus including a table member having a flat surface, said attachment comprising a cove molding rest having a flat bottom face to engage the flat surface of the table member and opposite side parallel upwardly converging flat surfaces rising at angles of 45 degrees from said flat bottom face, and said rest having a bottom recess adapted to fit over and receive therein said protractor arm whereby the arm will precisely position the rest on the table member in 45 degree angular relationship to said saw guideway means.

7. An attachment for a sawing table apparatus as defined in claim 6, and said rest having an angled end face normal to the flat surface of the table member and parallel to said guideway means.

8. An attachment for a sawing table apparatus as defined in claim 7, and said bottom recess having a blind end abutting the end of the protractor arm to thereby form a stop for the rest whereby the angled end face is positioned with precision in relation to said guideway means.

9. An attachment for a sawing table apparatus as defined in claim 6, and said rest being in the form of an elongated bar member and said opposite side upwardly converging flat surfaces being separated at the top of the rest by a top surface.

10. An attachment for a sawing table apparatus as defined in claim 6, and said saw guideway means including a saw blade slot, said rest having a 45 degree angled end face normal to the flat surface of the table member and adapted to coincide with one edge of said slot, said bottom recess having an end surface forming a stop for the rest in contact with an end surface of said protractor arm so that the 45 degree angled end face is caused to coincide with said one edge of said slot.

* * * * *